Patented June 18, 1929.

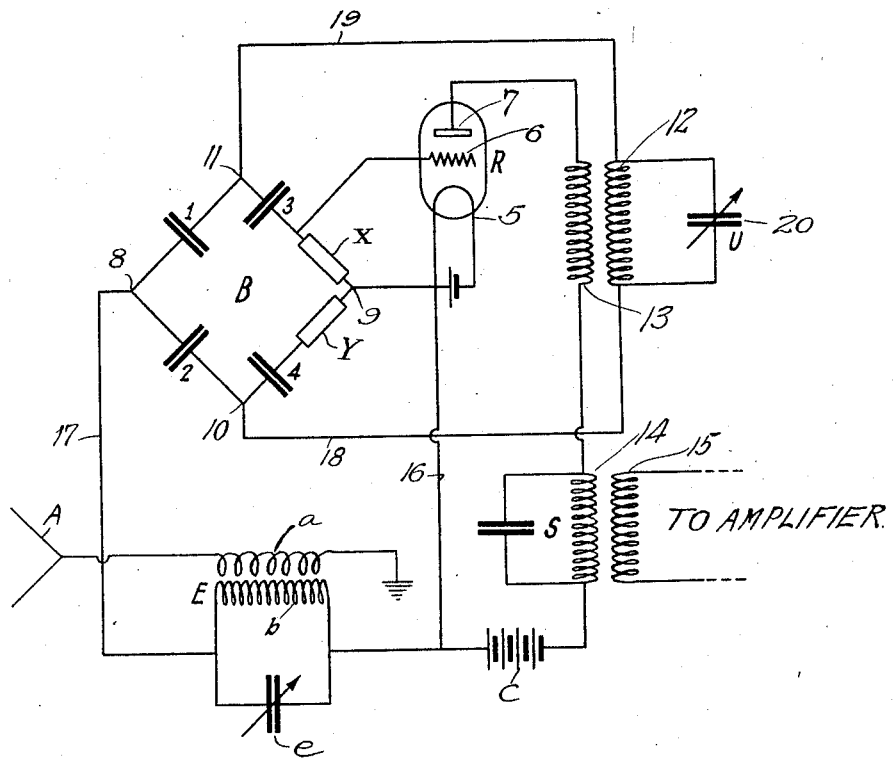

UNITED STATES PATENT OFFICE.

1,717,627

WILHELM RUNGE, OF BERLIN, GERMANY, ASSIGNOR TO GESELLSCHAFT FÜR DRAHTLOSE TELEGRAPHIE M. B. H. HALLESCHES, OF BERLIN, GERMANY.

BALANCED BRIDGE FOR AUTODYNE RECEIVER CIRCUITS.

Application filed November 9, 1925, Serial No. 67,751, and in Germany November 15, 1924.

This invention relates to methods and means employed for intermediate-frequency beat reception of electric oscillations.

The object of the invention is to provide an improved method for the reception of electric oscillations by the heterodyne system.

Another object of the invention is to employ one thermionic valve for the reception of high frequency oscillations on long and short waves. A further object of the invention is to provide a balanced bridge for the reception of electrical oscillations, whereby the receiving and heterodyning circuits may be dissociated.

A still further object is to make use of the balanced bridge circuit in connection with a single thermionic valve by means of which complete uncoupling of the receiving and heterodyning circuits is achieved.

Other objects of the invention will appear as set forth more fully hereinafter and as pointed out in the appended claims.

Referring to the drawing: the figure is a diagrammatic sketch showing a bridge arrangement associated with a thermionic valve together with the usual accompanying circuits when intermediate frequency beat reception of electrical oscillations is used. In this system, as is well known, there is superposed upon the incoming wave train a locally produced series of oscillations of different frequency. For telephony requirements this intermediate beat frequency is chosen very high so that it is inaudible. As a rule it should not fall below 50,000 oscillations per second. This intermediate frequency may be regarded as a new carrier frequency for the transmission of modulation frequencies. The general practice in reception as above indicated is to employ two thermionic valves, one of which is required for the local oscillator and the other for rectifying. The combination of both functions of reception as well as oscillation generation by means of one tube, i. e., the use of an oscillation thermionic valve (autodyne) is practical for the production of a high intermediate frequency only if very short waves,—150 meters, for example, are employed. In the case of long waves, as can be readily seen, the detuning of the receiving circuit relative to the incoming oscillations becomes too great to allow of satisfactory reception of these waves. For reception of the intermediate frequency in the case of long waves it has heretofore been necessary to separate the thermionic valve and the local oscillator. In the case of the present invention while using high intermediate frequency a single thermionic valve can be made to suffice for the reception of both long and short waves. For this purpose separation of the two oscillation circuits is resorted to, one of said circuits receiving the incoming high frequency current and feeding it to the valve, while the other circuit governs the frequency of the superposed (heterodyne) frequency. This separation must be effected in such a way that the two circuits will not interfere with one another, so that the change in the heterodyne frequency will not occasion untuning of the receiving circuits with the result that the tunings of both circuits may be effected entirely independently of one another, the oscillations of each circuit being able to influence the thermionic valve individually.

The subject matter of the present invention sets forth; that the two oscillation circuits (the receiving circuit and the heterodyne circuit governing the frequency) are so connected with the thermionic valve that each circuit is united with a diagonal arm of the balanced bridge arrangement.

The accompanying drawing illustrates a circuit arrangement embodying one form of my invention but I do not restrict myself to the specific form shown but include all circuit arrangements which fall within the scope of the appended claims.

In the figure the receiving aerial A is coupled by inductance $a$ to the coil $b$ of an oscillation circuit E including a tuning condenser $e$. The oscillation circuit E is connected by lead 16 to the filament 5 of a vacuum valve R and by lead 17 to a balanced bridge circuit B. Said bridge B has condensers 1 and 2 as two arms, a third arm 3 includes an impedance X and the capacity of valve R including its leads. In the fourth arm is provided in addition to capacity 4 a suitable impedance represented diagrammatically at Y to balance the bridge circuit. Points 8 and 9 may be termed two conjugate neutral points of bridge B and points 10 and 11 an opposite pair of conjugate neutral points, point 9 being joined to the filament 5. Across the neutral points 10 and 11 is connected by leads 18—19 an oscillation circuit U which governs the beat frequency and includes a tuning condenser 20 and an inductance 12. The circuit connected to the plate 7 of valve R includes a coil 13 regeneratively coupled to coil 12 and an oscillation circuit S which may be tuned to the beat frequency. Oscillation circuit S contains an inductance 14 which is magnetically coupled to coil 15 in the work circuit which may lead to any suitable translating device such as an amplifier. The current for the plate circuit is supplied by any suitable battery C.

In the operation of the receiver, the circuit E of the diagonal arm 9—16—17—8 is tuned to the incoming signal wave frequency, whereby corresponding potentials are applied to the conjugate points 8 and 9 of bridge B. As grid 6 of valve R is coupled to one arm of the bridge a varying potential is applied to the grid 6 which will cause a current of corresponding frequency in the plate circuit 7—13—C. Also the circuit U of the diagonal arm 10—18—19—11 is tuned to give the desired beat frequency whereby potential variations corresponding to the period of U are also impressed by arm 9—11 of the bridge on grid 6. The plate circuit of the valve therefore carries two currents whose frequency difference is the beat frequency to which oscillation circuit S is tuned. Currents of beat frequency are thereby applied by coil 15 to the amplifier circuit.

By means of the construction shown in which the tube with its capacity and resistance forms an arm of the bridge, perfect uncoupling of the two circuits E and U is obtained, while on the other hand, the potential of each of these circuits is supplied to the grid of the tube in such a way that receiving and local-generator action are accomplished.

Having now set forth the object and nature of my invention what I claim as new and useful is:

1. In a heterodyne system, a source of local oscillations, a balanced bridge coupled to said source, an input circuit connected to one pair of conjugate neutral points of said bridge, an output circuit and an oscillation circuit connected to another pair of conjugate neutral points of said bridge, said latter circuit being coupled to the output circuit.

2. The device of claim 1 wherein the circuit coupled to the output circuit includes means for governing the beat frequency.

3. The device of claim 1 wherein the output circuit includes an oscillating circuit tuned to the intermediate beat frequency.

4. In an autodyne receiver, a vacuum tube having a plate, a grid and a cathode, a balanced bridge, one arm of said bridge being coupled to the grid and cathode of the tube, a diagonal arm for said bridge comprising an input circuit, a second diagonal arm for said bridge, said second arm including an oscillating circuit adapted to govern the beat frequency, and means coupling the plate circuit of the tube to said second diagonal arm.

W. RUNGE.